Aug. 11, 1964  H. C. MEDLEY  3,144,282
AIR PURGED BEARING FOR SPIRAL CONVEYOR
Filed April 3, 1961
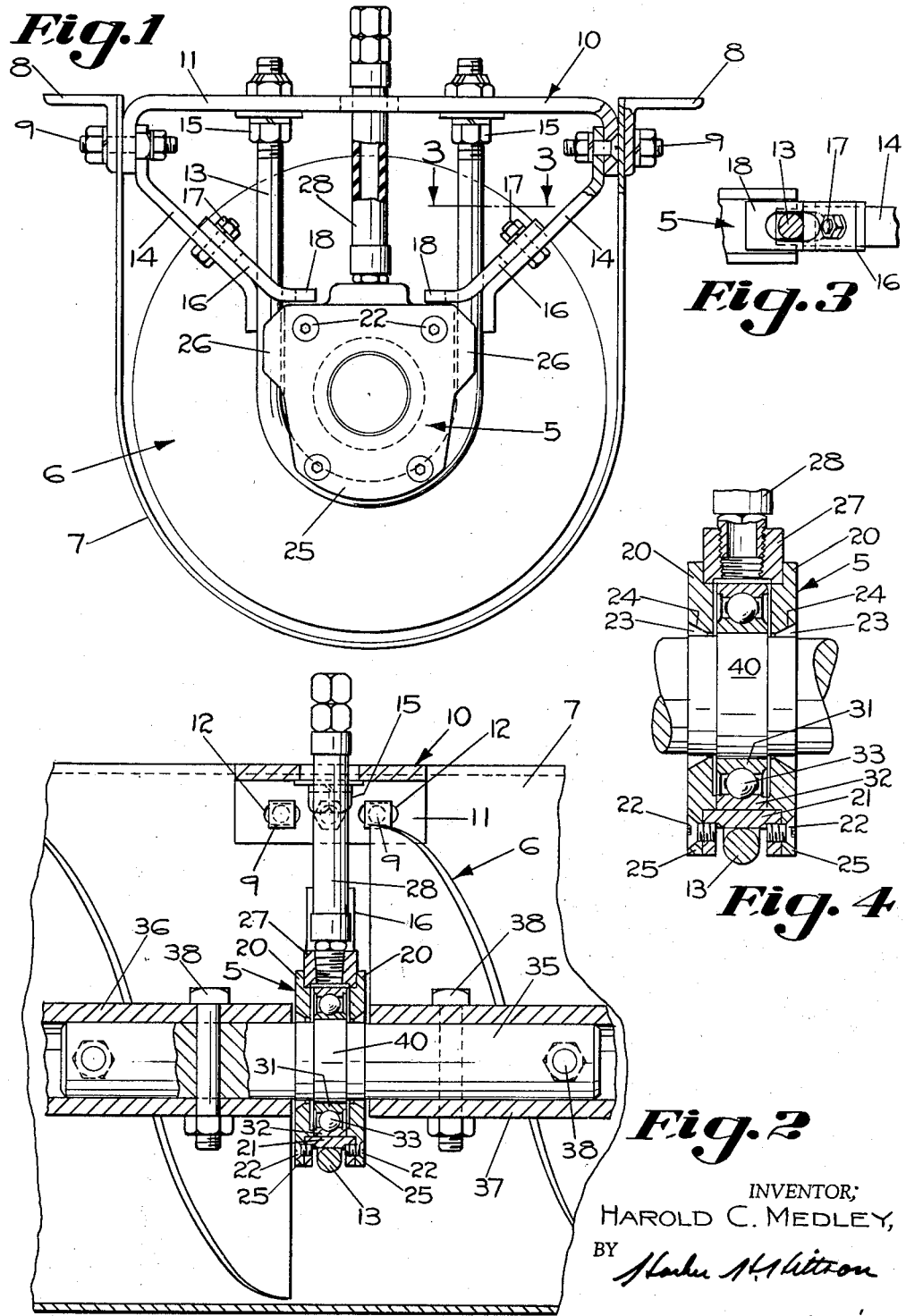
INVENTOR:
HAROLD C. MEDLEY,
BY
ATTY.

United States Patent Office 3,144,282
Patented Aug. 11, 1964

3,144,282
AIR PURGED BEARING FOR SPIRAL CONVEYOR
Harold C. Medley, New Albany, Ohio, assignor, by mesne assignments, to Jeffrey Galion Manufacturing Company, a corporation of Ohio
Filed Apr. 3, 1961, Ser. No. 100,381
1 Claim. (Cl. 308—187.1)

This invention relates to an air purged bearing for spiral conveyor. It relates, more specifically, to a bearing structure for spiral or screw conveyors which is provided with means for supplying air under pressure to the interior thereof which is allowed to escape therefrom to oppose the entrance into the bearing of small particles of the material being conveyed, such as granular or powdered material. For example, when the conveyor is conveying sugar, flour, or any other small particle material, the air pressure maintained within the bearing and the discharge of air therefrom under control will prevent the entrance of such particles into the bearing which would cause wear or clogging of the bearing or both.

Although the bearing of this invention will be described particularly with reference to spiral conveyors, it is to be understood that it is not necessarily limited to that type of conveyor. Also, although air is mentioned in this description as the purging fluid, it is to be understood that this invention is not limited to the use of air, although it is preferred, and that other purging fluids may be used.

In the accompanying drawing, a bearing embodying this invention has been illustrated but it should be understood that modifications may be made without departing from basic principles of this invention.

In the drawing:
FIGURE 1 is an elevational view, partly broken away, of a bearing and associated hanger bracket embodying this invention.
FIGURE 2 is an axial sectional view showing the bearing structure of this invention positioned at the joint between adjacent lengths of a spiral conveyor.
FIGURE 3 is a sectional detail taken along line 3—3 of FIGURE 1.
FIGURE 4 is an enlarged axial sectional view of the bearing shown in FIGURE 2.

With reference to the drawing, the bearing of this invention is illustrated generally by the numeral 5 and is shown in conjunction with a conveyor of the spiral type which is indicated generally by the numeral 6. The conveyor is shown as including a trough 7 which is open at its upper side and which has angle members 8 bolted thereto at its upper edges by means of the bolts 9. The bolts 9 also fasten in position within the trough a bearing suspending or hanger bracket indicated generally by the numeral 10.

The bracket 10 comprises the horizontal transverse upper bar 11 which has depending flanges at its outer ends that contact the adjacent inner surfaces of the sides of the trough. The depending flanges of the brace 11 are provided with enlarged slots 12 for receiving the bolts 9 to permit slight longitudinal and vertical adjustment of the brace relative to the trough. The brace 11 carries a U-bolt 13 which is suspended therefrom for receiving and embracing the bearing 5 and this U-bolt is braced laterally by means of the angle braces 14. The lower and inner end of each of these braces 14 is welded or otherwise fastened to the U-bolt and its upper end is fastened by a bolt 15 to the depending flange of the member 11. Hold-down bars 16 are bolted by bolts 17 to the braces 14 and their lower inturned ends 18 are positioned over the bearing 5 to hold it down in the supporting saddle provided by the U-bolt 13.

The bearing 5 includes a housing assembly formed by the opposed orifice plates 20 having a ring 21 positioned therebetween and clamped in such position by pairs of opposed cap screws 22 which are in angularly spaced positions around the ring 21. Each of the plates 20 is provided with a central orifice 23 which has an outwardly flaring edge or surface 24. The plates extend beyond the ring 21 at their lower sides to form the projecting flanges 25 for receiving the lower curved part of the U-bolt therebetween. Also, they project laterally adjacent their upper edges beyond the ring 21 to form the lateral ears 26 for receiving the vertical portions of the U-bolt. The housing assembly is provided with an inlet fitting 27 which is connected thereto in an airtight manner and preferably leads radially therefrom at the upper side thereof. This fitting receives the nipple end of a flexible hose assembly 28 which supplies air under pressure from a suitable source.

Within the housing assembly a suitable antifriction bearing arrangement is positioned. In the example shown, the bearing is of the ball type and includes the inner and outer races 31 and 32 with the balls 33 therebetween. It will be noted that there are clearance spaces between the bearing races and the associated orifice plates 20 to permit passage of air.

The bearing 5 is shown in FIGURE 2 as receiving the connecting shaft section 35 which joins two lengths 36 and 37 of a conveyor screw. The shaft is bolted by the transverse bolts 38 to the screw lengths. The shaft is provided with an annular bearing surface 40 which is positioned within and in contact with the inner race 31. However, it will be noted that the openings 23 in the orifice plates 20 are slightly larger than the associated parts of the shaft and do not contact therewith.

In the operation of this bearing, assuming that it is positioned between the screw lengths as indicated, air under pressure is supplied to the bearing through the hose 28. This air under pressure will be forced through the ball bearing and axially outwardly in both directions through the orifices 23. The surfaces 24 of the orifices will direct the air angularly outwardly relative to the shaft. Thus, purging air passing through the bearing will oppose the entrance thereinto of particles of material being conveyed. The volume of air supplied is controlled with reference to the size of the outlet orifices 23, so that a pressure will always be maintained within the bearing and the purging air being discharged will be under suitable pressure. Thus, as long as the pressure is maintained, no particles of material will enter the bearing. If, for any reason the air supply is interrupted for short periods and material does enter the bearing, when the pressure is restored the particles will be blown outwardly therefrom through the orifices 23.

It will be apparent from the above that this invention provides a bearing which is particularly useful in association with a shaft of a spiral conveyor, although it is not limited thereto. The invention provides fluid means for purging the bearing to normally prevent particles of material from entering thereinto or for forcing the particles therefrom in case they enter under abnormal conditions.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described this invention, what is claimed is:
In combination, a shaft, an antifriction bearing for said shaft, a housing for enclosing said antifriction bear- ing, said bearing including an inner race and an outer race, said inner race being secured to said shaft, said outer race being secured to said housing, antifriction means between said inner race and said outer race for rotation of said shaft relatively to said housing, said housing including walls disposed one at each side of said antifriction bearing, each of said walls being disposed adjacent to and spaced a small distance from said antifriction bearing to provide an annular restricted passage at each side of said antifriction bearing, each of said walls being spaced a small distance around said shaft to form a restricted orifice opening around the shaft surface at each side of said antifriction bearing, each said annular restricted passage being connected to an orifice opening, a port in said housing connected to said annular restricted passages for supplying purging fluid to said housing and flowing through said annular restricted passages to sweep the opposite sides of said antifriction bearing, and said fluid exhausting from said housing through said restricted orifice openings and thereby preventing contamination of said antifriction bearing.

References Cited in the file of this patent
UNITED STATES PATENTS

| | | |
|---|---|---|
| 1,957,054 | Waldorf | May 1, 1934 |
| 2,125,446 | Hurtt | Aug. 2, 1938 |
| 2,285,216 | Lundgren | June 2, 1942 |
| 2,299,119 | Yeoman | Oct. 20, 1942 |
| 2,455,227 | Le Clair | July 13, 1948 |
| 2,524,948 | Whitney | Oct. 10, 1950 |
| 2,750,233 | Yellott | June 12, 1956 |